(12) United States Patent
Long et al.

(10) Patent No.: US 8,700,547 B2
(45) Date of Patent: Apr. 15, 2014

(54) SPECTRAL CLUSTERING FOR MULTI-TYPE RELATIONAL DATA

(75) Inventors: Bo Long, Philadelphia, PA (US); Zhongfei Zhang, Vestal, NY (US)

(73) Assignee: The Research Foundation for the State University of New York, Binghamton, NY (US)

( * ) Notice: Subject to any disclaimer, the term of this patent is extended or adjusted under 35 U.S.C. 154(b) by 23 days.

(21) Appl. No.: 13/477,221

(22) Filed: May 22, 2012

(65) Prior Publication Data

US 2012/0296907 A1 Nov. 22, 2012

Related U.S. Application Data

(63) Continuation of application No. 12/125,804, filed on May 22, 2008, now Pat. No. 8,185,481.

(60) Provisional application No. 60/940,362, filed on May 25, 2007.

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 2005/0141769 | A1* | 6/2005 | Ho et al. | 382/225 |
| 2005/0270285 | A1* | 12/2005 | Zhou et al. | 345/420 |
| 2006/0045353 | A1* | 3/2006 | Brand | 382/224 |
| 2007/0078849 | A1* | 4/2007 | Slothouber | 707/5 |
| 2007/0255707 | A1* | 11/2007 | Tresser et al. | 707/6 |
| 2008/0243829 | A1* | 10/2008 | Liu et al. | 707/5 |
| 2008/0294684 | A1* | 11/2008 | Chi et al. | 707/103 R |

OTHER PUBLICATIONS

Hui Han; Hongyuan Zha; Giles, C.L., "Name disambiguation in author citations using a K-way spectral clustering method," Digital Libraries, 2005. JCDL '05. Proceedings of the 5th ACM/IEEE-CS Joint Conference on , vol., No., pp. 334,343, Jun. 7-11, 2005.*
Jennifer Neville and David Jensen. 2005. Leveraging relational autocorrelation with latent group models. In Proceedings of the 4th international workshop on Multi-relational mining (MRDM '05). ACM, New York, NY, USA, 49-55.*
Neville, J., Adler, M., Jensen, D., "Clustering relational data using attribute and link information." In: Proceedings of the Text Mining and Link Analysis Workshop, 2003.*
Zha, Hongyuan, et al. "Spectral relaxation for k-means clustering." Advances in neural information processing systems. 2001.*

* cited by examiner

*Primary Examiner* — Jeffrey A Gaffin
*Assistant Examiner* — David H Kim
(74) *Attorney, Agent, or Firm* — Steven M. Hoffberg; Ostrolenk Faber LLP

(57) ABSTRACT

A general model is provided which provides collective factorization on related matrices, for multi-type relational data clustering. The model is applicable to relational data with various structures. Under this model, a spectral relational clustering algorithm is provided to cluster multiple types of interrelated data objects simultaneously. The algorithm iteratively embeds each type of data objects into low dimensional spaces and benefits from the interactions among the hidden structures of different types of data objects.

20 Claims, 6 Drawing Sheets

AUTHOR-PAPER MATRIX
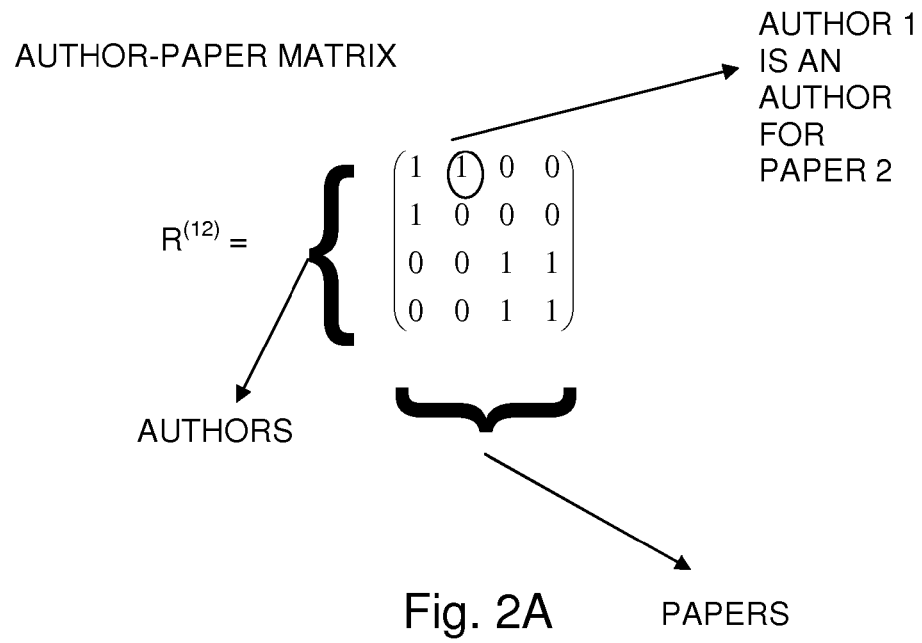
Fig. 2A
PAPER-WORD MATRIX
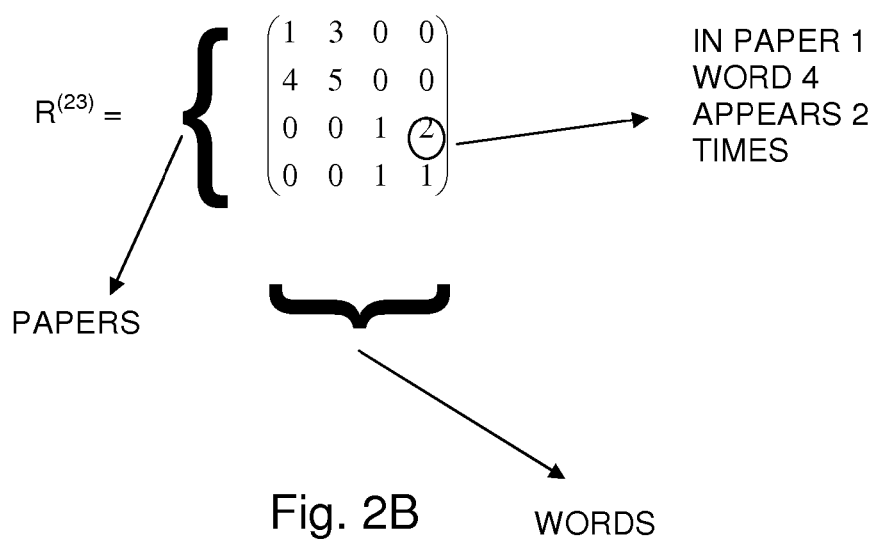
Fig. 2B
Fig. 3

SPECTRAL CLUSTERING FOR MULTI-TYPE RELATIONAL DATA

CROSS REFERENCE TO RELATED APPLICATIONS

The present application is a Continuation of U.S. patent application Ser. No. 12/125,804, filed May 22, 2008, now U.S. Pat. No. 8,185,481, issued May 22, 2012, which claims benefit of priority from U.S. Provisional Patent Application No. 60/940,362, filed May 25, 2007, the entirety of which are expressly incorporated herein by reference.

STATEMENT OF GOVERNMENT RIGHTS

This invention was made with government support under IIS0535162 awarded by the National Science Foundation and FA8750-04-1-0234 and FA8750-05-2-0284 by the AFRL. The government has certain rights in the invention.

BACKGROUND OF THE INVENTION

A. Field of the Invention

The invention relates to the field of clustering data objects stored in a data processing system, particularly in a relational database.

B. Related Art

Clustering on multi-type relational data has attracted more and more attention in recent years due to its high impact on various important applications, such as Web mining, e-commerce and bioinformatics. Clustering of objects in a relational database is useful in that it makes searching more efficient. The paper Long et al, "Co-clustering by Block Value Decomposition" Bo Long, Zhongfei (Mark) Zhang, Philip S. Yu, in KDD2005 discusses a method for clustering data objects referred to as block value decomposition. This method has some limitations when applied to relationships between multiple types of data, because it focuses on only one matrix relating data objects.

Most clustering approaches in the literature focus on "flat" data in which each data object is represented as a fixed length feature vector (R. O. Duda et al., 2000). However, many real-world data sets are much richer in structure, involving objects of multiple types that are related to each other, such as Web pages, search queries and Web users in a Web search system, and papers, key words, authors and conferences in a scientific publication domain. In such scenarios, using traditional methods to cluster each type of object independently may not work well due to the following reasons.

First, to make use of relation information under the traditional clustering framework, the relation information needs to be transformed into features. In general, this transformation causes information loss and/or very high dimensional and sparse data. For example, if we represent the relations between Web pages and Web users as well as search queries as the features for the Web pages, this leads to a huge number of features with sparse values for each Web page. Second, traditional clustering approaches are unable to tackle the interactions among the hidden structures of different types of objects, since they cluster data of a single type based on static features. Note that the interactions could pass along the relations, i.e., there exists influence propagation in multi-type relational data. Third, in some machine learning applications, users are not only interested in the hidden structure for each type of object, but also the global structure involving multiple types of objects. For example, in document clustering, except for document clusters and word clusters, the relationship between document clusters and word clusters is also useful information. It is difficult to discover such global structures by clustering each type of object individually.

Spectral clustering (Ng et al., 2001; Bach & Jordan, 2004) has been well studied in the literature. The spectral clustering methods based on the graph partitioning theory focus on finding the best cuts of a graph that optimize certain pre-defined criterion functions. The optimization of the criterion functions usually leads to the computation of singular vectors or Eigenvectors of certain graph affinity matrices. Many criterion functions, such as the average cut (Chan et al., 1993), the average association (Shi & Malik, 2000), the normalized cut (Shi & Malik, 2000), and the min-max cut (Ding et al., 2001), have been proposed.

Spectral graph partitioning has also been applied to a special case of multi-type relational data, bi-type relational data such as the word-document data (Dhillon, 2001; H. Zha & H. Simon, 2001). These algorithms formulate the data matrix as a bipartite graph and seek to find the optimal normalized cut for the graph. Due to the nature of a bipartite graph, these algorithms have the restriction that the clusters from different types of objects must have one-to-one associations.

Clustering on bi-type relational data is called co-clustering or bi-clustering. Recently, co-clustering has been addressed based on matrix factorization. Both Long et al. (2005) and Li (2005) model the co-clustering as an optimization problem involving a triple matrix factorization. Long et al. (2005) propose an EM-like algorithm based on multiplicative updating rules and Li (2005) proposes a hard clustering algorithm for binary data. Ding et al. (2005) extend the non-negative matrix factorization to symmetric matrices and show that it is gives the same results as the Kernel K-means and the Laplacian-based spectral clustering. Several previous efforts related to co-clustering are model based. PLSA (Hofmann, 1999) is a method based on a mixture decomposition derived from a latent class model. A two-sided clustering model is proposed for collaborative filtering by Hofmann and Puzicha (1999). Information-theory based co-clustering has also attracted attention in the literature. El-Yaniv and Souroujon (2001) extend the information bottleneck (TB) framework (Tishby et al., 1999) to repeatedly cluster documents and then words. Dhillon et al. (2003) propose a co-clustering algorithm to maximize the mutual information between the clustered random variables subject to the constraints on the number of row and column clusters. A more generalized co-clustering framework is presented by Banerjee et al. (2004) wherein any Bregman divergence can be used in the objective function.

Comparing with co-clustering, clustering on general relational data, which may consist of more than two types of data objects, has not been well studied in the literature. Several noticeable efforts are discussed as follows. Taskar et al. (2001) extend the probabilistic relational model to the clustering scenario by introducing latent variables into the model. Gao et al. (2005) formulate star-structured relational data as a star-structured m-partite graph and develop an algorithm based on semi-definite programming to partition the graph. Like bipartite graph partitioning, it has limitations that the clusters from different types of objects must have one-to-one associations and it fails to consider the feature information.

An intuitive idea for clustering multiple types of interrelated objects is the mutual reinforcement clustering. The idea works as follows: start with initial cluster structures of the data; derive the new reduced features from the clusters of the related objects for each type of object; based on the new features, cluster each type of object with a traditional clustering algorithm; go back to the second step until the algorithm converges. Based on this idea, Zeng et al. (2002) propose a framework for clustering heterogeneous Web objects and Wang et al. (2003) present an approach to improve the cluster quality of interrelated data objects through an iterative reinforcement clustering process. However, there is no sound objective function and theoretical proof on the effectiveness and correctness (convergence) of the mutual reinforcement clustering.

To summarize, the research on multi-type relational data clustering has attracted substantial attention, especially in the special cases of relational data. However, there is still limited and preliminary work on the general relational data.

See also, U.S. Published Patent Application Nos. 20070067281; 20060270918; 20060235812; 20060200431; 20060179021; 20060080059; 20060050984; 20060045353; 20060015263; 20050286774; 20050285937; 20050278352; 20050270285; 20050251532; 20050246321; 20050149230; 20050141769; 20050110679; 20040267686; 20040054542; 20030081833; 20020116196, each of which is expressly incorporated herein by reference. See also, U.S. Pat. Nos. 7,006,944; 6,895,115; 6,070,140; 5,806,029; 5,794,192; 5,664,059; 5,590,242; 5,479,572; 5,274,737, each of which is expressly incorporated herein by reference. See e.g., Spectral Clustering, ICML 2004 Tutorial by Chris Ding crd.lbl.gov/~cding/Spectral/, crd.lbl.gov/~cding/Spectral/notes.html, Spectral Clustering www.ms.washington.edu/~spectral/ (and papers cited therein), A. Ng, M. Jordan, and Y. Weiss, "On spectral clustering: Analysis and an algorithm," In Advances in Neural Information Processing Systems 14: Proceedings of the 2001", citeseer.ist.psu.edu/ng01spectral.html; Francis R. Bach, Michael I. Jordan. Learning spectral clustering, Advances in Neural Information Processing Systems (NIPS) 16, 2004, cmm.ensmp.fr/~bach/nips03_cluster.pdf (See also cmm.ensmp.fr/~bach/); Ulrike von Luxburg, Max Planck Institute for Biological Cybernetics Technical Report No. TR-149, "A Tutorial on Spectral Clustering," August 2006 www.kyb.mpg.de/publications/attachments/Luxburg06_TR_%5B0%5D.pdf.

SUMMARY AND OBJECTS OF THE INVENTION

It would be desirable to improve spectral clustering further so that it can deal with more types of data and so that separation of data elements into clusters is more well-defined.

Objects and advantages of the invention will be apparent in the following.

It is an object to provide a method comprising the steps of:
embodying data structures on a computer readable medium, the data structures comprising: data objects, each data object including a vector with a plurality of elements of a same type; feature matrices, there being a feature matrix corresponding with each data object; relationship matrices describing pairwise relationships between the data objects; and weighting matrices;
effecting a spectral clustering algorithm on at least one data processing device, the spectral clustering algorithm comprising:
    assigning, to each of a plurality of vigorous cluster indicator matrices, leading eigenvectors derived from a formula that is a function of the feature matrices, the relationship matrices, the weight matrices and at least one cluster indicator matrix other than the one receiving the assigning;
    iteratively improving the vigorous cluster indicator matrices; and
    transforming the vigorous cluster indicator matrices into a set of cluster indicator matrices comprising a cluster indicator matrix for each data object; and recognizing a clustering of the elements within a data object based on the cluster indicator matrices.

It is also an object to provide a method of indicating clusters, comprising the steps of: initializing a set of matrices with orthonormal matrices representing multi-type objects, each object having a respective relation with other objects and a set of features; automatically iteratively processing a symmetric matrix comprising a set of weights, which maximizes an objective function of the orthonormal matrices, relations and the features, and then updating each orthonormal matrix by the leading eigenvectors of the symmetric matrix; and after the iteratively processing, transforming each orthonormal matrix into a cluster indicator matrix.

It is a further object to provide a method comprising: embodying a plurality of types of data as object data structures in the at least one storage device, the objects embodying elements of at least two distinct respective types; using the data processing device to effect clustering of the elements of the objects using a spectral clustering algorithm, the spectral clustering algorithm computing at least one joint function of at least: at least one vigorous cluster indicator matrix relating to clustering of elements in at least one of the objects; and at least one relationship matrix relating at least two objects of different types; and generating a data structure representing a clustering of elements, based on a result of the spectral clustering algorithm. The multi-type relational data clustering may be effected using collective factorization on the relationship matrices. The collective factorization may comprise minimizing L, where $$L = \sum_{1 \leq i \leq j \leq m} w_a^{(ij)} \| R^{(ij)} - C^{(i)} A^{(ij)} (C^{(j)})^T \|^2 + \sum_{1 \leq i \leq m} w_b^{(i)} \| F^{(i)} - C^{(i)} B^{(i)} \|^2$$

w.r.t. $C^{(i)} \in \{0,1\}^{n_i \times k_i}$, $A^{(ij)} \in \mathbb{R}^{k_i \times k_j}$, and $B^{(i)} \in \mathbb{R}^{k_i \times f_i}$ subject to the constraints: $\Sigma_{q=1}^{k_i} C_{pq}^{(i)} = 1$,
where
$1 \leq p \leq n_i$, $1 \leq i \leq j \leq m$,
$\|\cdot\|$ denotes the Frobenius norm for a matrix;
$C^{(i)} \in \{0,1\}^{n_i \times k_i}$ is a cluster indicator matrix for data object $\chi_i$ such that $\Sigma_{q=1}^{k_i} C_{pq}^{(i)} = 1$ and $C_{pq}^{(i)}$ denotes that the $p^{th}$ object in $\chi_i$ is associated with the $q^{th}$ cluster;
$A^{(ij)} \in \mathbb{R}^{k_i \times k_j}$ is a cluster association matrix such that $A_{pq}^{ij}$ denotes the association between cluster p of $\chi_i$ and cluster q of $\chi_j$;
$F^{(i)} \in \mathbb{R}^{n_i \times f_i}$ is a feature matrix of $\chi_i$, the cluster structure of which being reflected in the factorization of $F^{(i)}$ such that $F^{(i)} \approx C^{(i)} B^{(i)}$; and
$B^{(i)} \in \mathbb{R}^{k_i \times f_i}$ is the feature basis matrix which consists of $k_i$ basis vectors in the feature space, each a representing cluster center.

The clustering may comprise iteratively embedding each type of data object into at least one low dimensional space. The clustering may benefit from interactions among hidden structures of different types of data objects, the interactions being characterizable by clusters. The clustering may also comprise achieving a dimensionality having an order less than a number of elements in a data object, by taking a predetermined number of leading eigenvectors of a matrix including values that relate to more than one type of data.

The data objects may be embodied in the form of electronically represented vectors; and the spectral clustering algorithm may comprise the substep of iteratively clustering the data objects by computing at least one matrix product derived from at least a function of a relationship matrix, a vigorous cluster indicator matrix, a vigorous cluster indicator matrix transpose, and a relationship matrix transpose. A first vigorous cluster indicator matrix may be updated using the matrix product derived from at least one second vigorous cluster indicator matrix. The vigorous cluster indicator matrix may be updated as the leading k eigenvectors of the matrix product, where k is a number of clusters sought. The clustering may include forming at least two such matrix products. A vigorous cluster indicator matrix may be updated using the leading k eigenvectors of a sum of at least two such matrix products.

The spectral clustering algorithm may compute the following formula:

$$\max_{(C^{(p)})^T C^{(p)} = I_{k_p}} tr((C^{(p)})^T M^{(p)} C^{(p)})$$

$M^{(p)}$ being a joint function of at least
$w_b^{(p)}(F^{(p)}(F^{(p)})^T)$, $$\sum_{p<j\leq m} w_a^{(pj)}\left((R^{(pj)} C^{(j)} (C^{(j)})^T (R^{(pj)})^T)\right), \text{ and}$$

$$\sum_{1\leq j<p} w_a^{(pj)}\left((R^{(jp)})^T C^{(j)} (C^{(j)})^T (R^{(pj)})\right)$$

where
$C^{(p)}$ is the vigorous cluster indicator matrix for cluster number p;
superscript T indicates the transpose of a matrix;
$R^{(ij)}$ is a relationship matrix indicating a relationship between two data objects $X_i$ and $X_j$;
j and p are index variables such that $1 \leq j$, $p \leq m$, $j \neq p$;
$F^{(p)}$ is a feature matrix relating to data object p;
m is the number of data objects being considered;
$w_b^{(p)}$ indicates an element of a weighting vector relating to the feature matrices; and
$w_a^{(jp)}$ and $w_a^{(pj)}$ indicate elements of weighting matrices relating to clustering, the weighting matrices being specified by a user
$M^{(p)}$ may be a joint function of $w_s^{(p)} S^{(p)}$ where
$S^{(p)}$ is a symmetric matrix denoting intra-type relationships within a data object vector; and
$w_s^{(p)}$ denotes a weight for $S^{(p)}$.

The spectral clustering algorithm may comprise using the following algorithm:
Input: Relation matrices $\{R^{(ij)} \in \mathbb{R}^{n_i \times n_j}\}_{1 \leq i \leq j \leq m}$, feature matrices $\{F^{(i)} \in \mathbb{R}^{n_i \times f_i}\}_{1 \leq i \leq j \leq m}$, numbers of clusters weights $\{k_i\}_{1 \leq i \leq m}$, weights $\{w_a^{(ij)}, w_b^{(i)} \in \mathbb{R}_+\}_{1 \leq i \leq j \leq m}$.
Output: Cluster indicator matrices $\{C^{(p)}\}_{1 \leq p \leq m}$.
Method:
a: Initialize $\{C^{(p)}\}_{1 \leq p \leq m}$ with othonormal matrices.
b: repeat
  c: for p=1 to m do
    d: Compute the matrix $M^{(p)}$
    e: Update $C^{(p)}$ by the leading $k_p$ eigenvectors of $M^{(p)}$.
  f: end for
g: until convergence
h: for p=1 to m do
  i: transform $C^{(p)}$ into a cluster indicator matrix by k-means
j: end for .

where
$n_i$ is a number of elements in data object i;
$f_i$ is a number of features for data object i
$M^{(p)}$ being a joint function of at least
$w_b^{(p)}(F^{(p)}(F^{(p)})^T)$, $$\sum_{p<j\leq m} w_a^{(pj)}\left((R^{(pj)} C^{(j)} (C^{(j)})^T (R^{(pj)})^T)\right), \text{ and}$$

$$\sum_{1\leq j<p} w_a^{(pj)}\left((R^{(jp)})^T C^{(j)} (C^{(j)})^T (R^{(pj)})\right)$$

$C^{(p)}$ is the vigorous cluster indicator matrix for cluster number p;
superscript T indicates the transpose of a matrix;
$R^{(ij)}$ is a relationship matrix indicating a relationship between two data objects $X_i$ and $X_j$;
j and p are index variables such that $1 \leq j$, $p \leq m$, $j \neq p$;
$F^{(p)}$ is a feature matrix relating to data object p;
m is the number of data objects being considered;
$w_b^{(p)}$ indicates an element of a weighting vector relating to the feature matrices; and
$w_a^{(jp)}$ and $w_a^{(pj)}$ indicate elements of weighting matrices relating to clustering, the weighting matrices being specified by a user.
For example, M(P) may be as follows:

$$M^{(p)} = w_b^{(p)}\left(F^{(p)}(F^{(p)})^T\right) + \sum_{p<j\leq m} w_a^{(pj)}\left((R^{(pj)} C^{(j)} (C^{(j)})^T (R^{(pj)})^T)\right) +$$

$$\sum_{1\leq j<p} w_a^{(jp)}\left((R^{(jp)})^T C^{(j)} (C^{(j)})^T (R^{(jp)})\right) + w_s^{(p)} S^{(p)}$$

wherein
$S^{(p)}$ is a symmetric matrix denoting intra-type relationships within a data object vector; and
$w_s^{(p)}$ denotes a weight for $S^{(p)}$.

It is also an object to provide a method of clustering data, comprising the steps of:
(a) providing a set of first matrices relating at least three types of objects, each object having a set of features and a set of respective relations with respect to other objects;
(b) automatically generating a second matrix comprising a set of values, which maximizes an objective function of the sets of first matrices, features and relations; and
(c) automatically transforming each second matrix into a cluster indicator matrix.

The matrices in the set of first matrices may be orthonormal. The second matrix may be symmetric. The sets of features and relations may be embodied as third and fourth sets of matrices respectively. The second matrix may be a function of at least: at least one relation matrix representing respective relations between distinct members of m sets to be clustered into $k_p$ disjoint clusters, where p is an index running from 1 to m; at least one feature matrix where each element denotes a feature value for an associated data object; the tentative cluster characterization matrices; and a set of weights for different types of relations and features.

It is a further object to provide a method of clustering data, comprising the steps of:
(a) providing a set of objects, the set comprising at least three types of data, each object having an associated feature matrix and an associated relation matrix, representing respective relations with other objects;

(b) collectively factorizing the set of matrices, to discover hidden structures of the objects based on both feature information and relation information;

(c) generating a symmetric matrix comprising a set of weights, which maximizes an objective function of the sets of orthonormal matrices, feature matrices and relation matrices; and (d) deriving a set of cluster indicator matrices from the collective factorization, to achieve adaptive dimensionality reduction for each type of data.

A still further object provides a method for uncovering hidden structures in data embodied on a storage device, the method comprising executing operations implementing a spectral clustering algorithm on at least one computer, the operations comprising: characterizing clustering of data of at least first, second, and third types using first, second and third tentative cluster characterization matrices, respectively; and iteratively improving each tentative cluster characterization matrix using combinations of other matrices, the other matrices characterizing relationships between data of different types. For example, during each iteration, a tentative cluster matrix is embodied in the storage device as the k leading eigenvectors of the arithmetic combinations. The other matrices that are used to improve the first tentative cluster characterization matrix may comprise at least one of the second and third tentative cluster characterization matrices. The other matrices used to improve the first tentative cluster indication matrix may include a transpose of at least one of the second and third tentative cluster indication matrices. The other matrices may comprise at least one of: feature matrices, weight matrices, and relationship matrices.

The iteratively improving process may comprise calculating a matrix $M^{(p)}$, which is a function of at least: at least one relation matrix representing respective relations between distinct members of m sets to be clustered into $k_p$ disjoint clusters, where p is an index running from 1 to m; at least one feature matrix where each element denotes a feature value for an associated data object; the tentative cluster characterization matrices; and a set of weights for different types of relations and features. The operations may further comprise using the k-means algorithm to transform the tentative cluster characterization matrices into cluster indicator matrices.

At least one of the cluster matrices may associate advertising data with other data by placing the advertising in the same cluster with the other data.

The method may further make use of feature or relationship data provided by an advertiser to inform clustering of the advertising data with the other data.

Another object provides a computer method comprising executing operations implementing a spectral clustering algorithm using at least one data processing device and at least one storage medium, the method comprising embodying an intermediate cluster matrix data structure on the medium as the leading k eigenvalues of arithmetic combinations of other matrix data structures; and iteratively improving the intermediate cluster matrix data structure.

A further object provides a computer method for reducing dimensionality of data objects in a multi-type relational database, the method comprising executing operations in at least one data processing device, the operations comprising:

(a) initializing a set of matrices, which are precursors to cluster indicator matrices;

(b) iteratively processing each matrix as the leading eigenvectors of a linear combination of at least one of the following terms: (i) at least one feature matrix product that is a feature matrix multiplied by its transpose; and (ii) at least one relationship/cluster matrix that is a joint function of a relationship matrix, a precursor to a cluster matrix, the transpose of the precursor to the cluster matrix; and the transpose of the relationship matrix.

According to one embodiment:

the precursors to the cluster indicator matrices are denoted $\{C^{(p)}\}_{1 \le p \le m}$;

the feature matrix product is denoted $F^{(p)}(F^{(p)})^T$;

the relationship/cluster matrix product is a function of two or more terms selected from the group $((R^{(pj)}C^{(j)}(C^{(j)})^T(R^{(pj)^T}))$ and $((R^{(jp)})^T C^{(j)}(C^{(j)})^T(R^{(jp)}))$, j being an index variable running between p and m for the first term and between 1 and p for the second term;

$R^{(pj)} \in \mathbb{R}^{n_p \times n_j}$ is a relation matrix representing a relation between data object vectors $\chi_p$ and $\chi_j$, and $R^{(jp)} \in \mathbb{R}^{n_j \times n_p}$ is a relation matrix representing a relation between $\chi_j$ and $\chi_p$;

$\chi_j$ and $\chi_p$ are members of m sets to be clustered into $k_j$ and $k_p$ disjoint clusters, respectively; and $F^{(p)} \in \mathbb{R}^{n_p \times f_j}$ is a feature, matrix where an element $F_{pq}^{(p)}$ denotes the $q^{th}$ feature value for the object $\chi_p$, and $f_j$ is the number of features for $\chi_j$.

The linear combination may comprise use of weights $w_a^{(pj)}$ and $w_a^{(jp)}$ for the first and second terms, respectively. The iteration may proceed until a convergence criterion is reached. Once a convergence criterion is reached, the precursors of the cluster indicator matrices may be transformed into cluster indicator matrices by use of the k means algorithm. The precursors of the cluster indicator matrices may be pre-distorted. The precursors of the cluster indicator matrices may be orthonormal.

An object also provides a method comprising maintaining a database of data organized into data objects of at least three types, which database is embodied on at least one medium readable by a data processing device; and effecting a spectral clustering algorithm on the data objects using at least one data processing device. The spectral clustering algorithm may comprise iteratively improving a precursor of a cluster indicator matrix as a function of relationship matrices describing relationships between data objects of distinct types. The spectral clustering algorithm may comprise iteratively improving a first precursor of a first cluster indicator matrix as a function of a second precursor to a second cluster indicator matrix, the first precursor relating to a first data object relating to a first type of data and the second precursor relating to a second data object relating to second type of data, wherein the first and second types are distinct. The data objects may comprise elements representing web pages.

BRIEF DESCRIPTION OF THE DRAWINGS

FIG. 2A shows an author-paper matrix;

FIG. 2B shows a paper-word matrix;

FIG. 3 shows a cluster matrix;

DETAILED DESCRIPTION OF THE PREFERRED EMBODIMENTS

This description will start with a simplified example and proceed to a more formal treatment.

The term "spectral clustering" is defined herein as an algorithm that clusters data objects using eigen decomposition.

Throughout the specification and claims herein variables are used. The use of these variables does not imply that other letters, numbers, or characters could not be used to represent the same concepts. The purpose of the variables is as a shorthand notation to avoid having to repeat cumbersome phrases, not to limit the scope of the specification or claims.

Figure 1A:
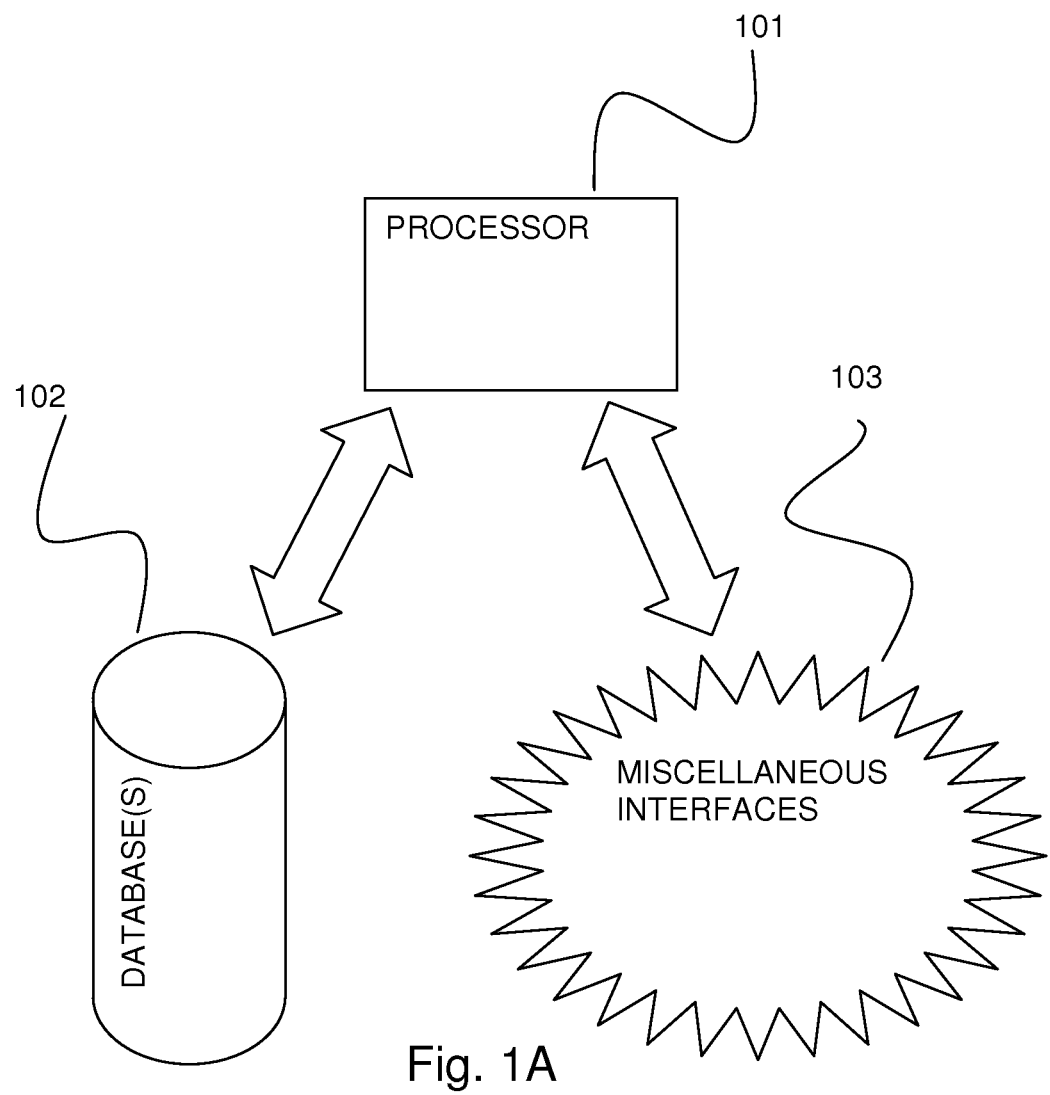
FIG. 1A shows a computer system.

FIG. 1A a shows a computer system suitable for operating the invention. It includes at least one processor 101, at least one storage device 102, and miscellaneous interfaces 103. The processor 101 may be of any suitable type such as a PC, a server, a mainframe, or an array of processors working in parallel. The storage device 102 also may be of any suitable type, including magnetic, electronic, and/or optical media. The storage device may embody data objects such as a relational database and/or program code for informing operation of the processor 101. The miscellaneous interfaces may include interfaces to user input/output devices such as keyboards, screens, pointer devices, printers. In addition the miscellaneous interfaces may include interfaces to networks such as LAN networks or the Internet. The processor 101 may also communicate with the storage device 102 via a network.

Figure 1B:
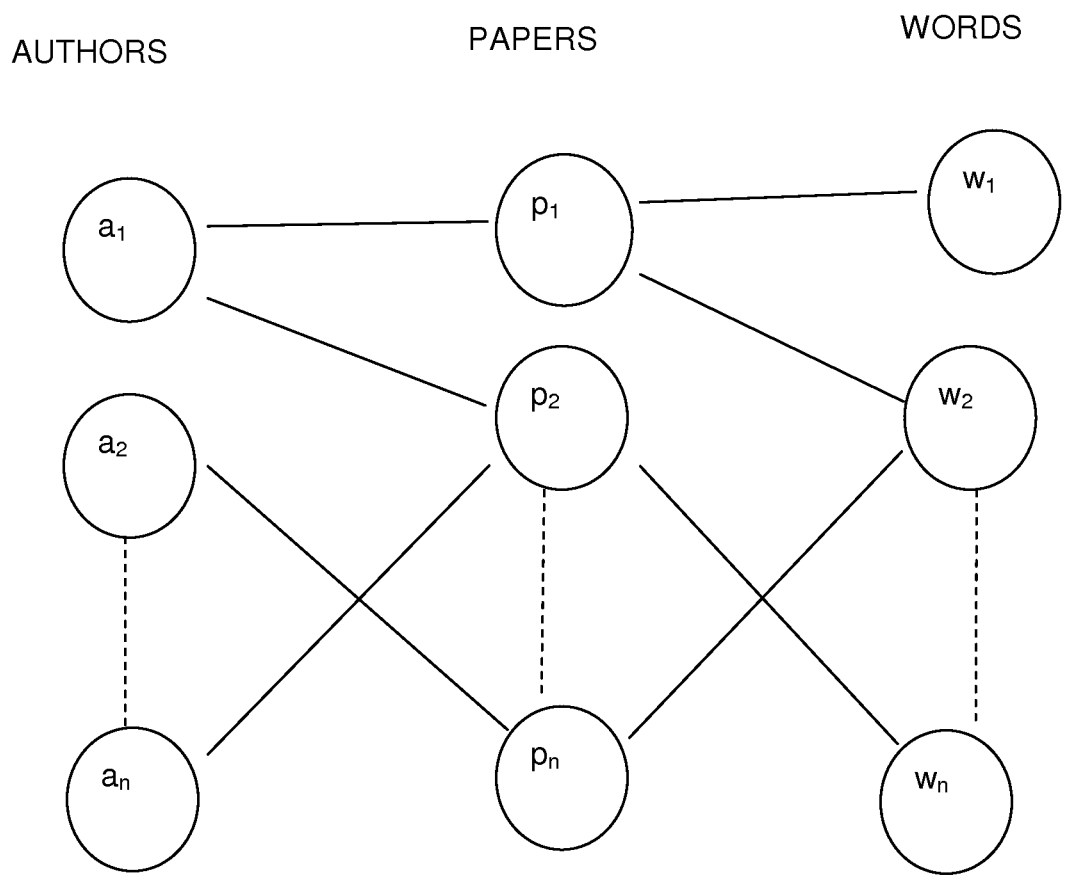
FIG. 1B shows sample data objects in a multi-type relational database.

FIG. 1B shows a hypothetical database to be stored in storage device 102. The database includes a list of authors ($a_1$, $a_2$, ... $a_{n1}$), a list of papers ($p_1$, $p_s$, ..., $p_{n2}$), and a list of words ($w_1$, $w_2$, ... $w_{n3}$). Each list is considered a "data object" for the purposes of this application. In general a "data object" herein will be a list or vector of data. For the purposes of this example, author, paper, and writer lists, will be referred to as the first, second, and third list, respectively. Lines connecting the data objects indicate relationships. For instance author 1 is a writer of both paper 1 and paper 2, while paper 2 was written by both author 1 and author n1. In general, an author can write more than one paper. The paper can have more than one author. And words can appear in more than one paper.

The relationship between objects of different types can be expressed in the form of a matrix. FIG. 2A shows a first example of such a matrix $R^{(12)}$. This matrix shows the relationship between data object 1, the list of authors, and data object 2, the list of papers. The superscripts 1 and 2 indicate which data objects are related via the matrix. In this matrix, each row represents an author and each column represents a paper. Author number 1 is an author for paper number 2. Therefore element $R_{12}^{(12)}$, circled in the figure, is set to 1 indicating a positive relationship. By way of contrast, Author number 1 is not an author of paper number 3. Therefore element $R_{13}^{(12)}$ is set to zero, indicating a negative relationship.

FIG. 2B shows a second example of such a matrix, $R^{(23)}$. This matrix shows the relationship between data object 2, the list of papers, and data object 3, the list of words. The superscripts 2 and 3 indicate which data objects are related via the matrix. In this matrix, each row represents a paper and each column represents a word. Paper number 3 contains word number 4 twice. Therefore element $R_{34}^{(23)}$, circled in the figure, is set to 2 indicating how many instances of the word are present. By way of contrast, paper 3 does not contain word number 2. Therefore element $R_{32}^{(23)}$ is set to zero, indicating a negative relationship.

FIG. 3 shows an example of a cluster matrix. Each element of a data object is to be assigned to a cluster. Therefore there is a cluster matrix for each data object. Each row in the cluster matrix represents an element of the data object. Each column of the cluster matrix represents a cluster number for the element. FIG. 3 shows a cluster matrix $C^{(1)}$ for data object 1, the list of authors. Element $C_{22}^{(1)}$, circled in the figure, is set to 1, showing that author number 2 belongs to cluster number 2.

Relationship and cluster matrices will also be stored in storage device or devices 102.

Now a simplified example of an algorithm in accordance with the invention will be presented. This algorithm may be implemented as program code stored in device 102. Alternatively, the algorithm may be implemented as firmware or an ASIC within processor 101, or in any other suitable fashion.

Figure 4:
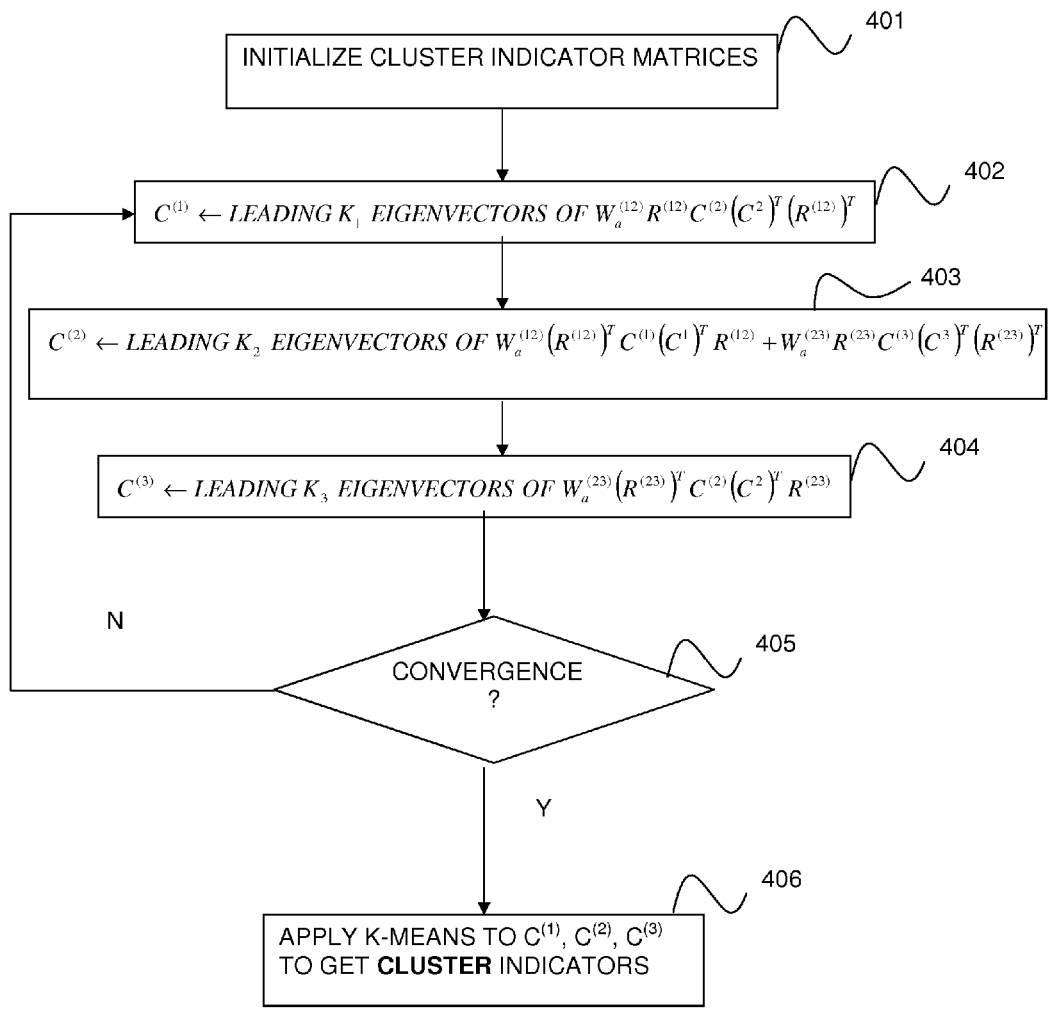
FIG. 4 shows a simplified flowchart of an algorithm in accordance with the invention.

FIG. 4 shows a simplified version of the algorithm as applied to the example given in FIGS. 1B, 2A, 2B and 3. At 401, the cluster matrices are initialized. At 402, $C^{(1)}$ is updated as the leading $k_1$ eigenvectors of the matrix product $W_a^{(12)}R^{(12)}C^{(2)}(C^2)^T(R^{(12)})^T$, where $W_a^{(12)}$ is a matrix of weighting elements selected by the user and $k_1$ is the number of clusters for the first data object, i.e. for the list of authors. At 403, $C^{(2)}$ is updated as the leading $k_2$ eigenvectors of the matrix product sum $W_a^{(12)}(R^{(12)})^T C^{(1)}(C^1)^T R^{(12)} + W_a^{(23)} R^{(23)} C^{(3)} (C^3)^T (R^{(23)})^T$, with the significance of the variables being the same mutatis mutandi. At 404, $C^{(3)}$ is updated as the leading $k_3$ eigenvectors of the matrix product $W_a^{(23)}(R^{(23)})^T C^{(2)}(C^2)^T R^{(23)}$. At 405, it is tested whether convergence has been reached. If not, steps 402, 403, and 404 are repeated. When convergence is reached the k-means algorithm is applied to matrices $C^{(1)}$, $C^{(2)}$, and $C^{(3)}$. The k-means algorithm is disclosed in Zha, H., Ding, C., Gu, M., He, X., & Simon, H. "Spectral relaxation for k-means clustering," *Advances in Neural Information Processing Systems*, 14 (2002).

A more general version of this algorithm is:

Algorithm 1 Spectral Relational Clustering
Input: Relation matrices $\{R^{(ij)} \in \mathbb{R}^{n_i \times n_j}\}_{1 \leq i \leq j \leq m}$, feature matrices $\{F^{(i)} \in \mathbb{R}^{n_i \times f_i}\}_{1 \leq i \leq m}$, numbers of clusters $\{k_i\}_{1 \leq i \leq m}$, weights $\{w_a^{(ij)}, w_b^{(i)} \in \mathbb{R}_+\}_{1 \leq i \leq j \leq m}$.
Output: Cluster indicator matrices $\{C^{(p)}\}_{1 \leq p \leq m}$.
Method:
1: Initialize $\{C^{(p)}\}_{1 \leq p \leq m}$ with othonormal matrices.
2: repeat
   3: for p=1 to m do
   4: Compute the matrix $M^{(p)}$
   5: Update $C^{(p)}$ by the leading $k_p$ eigenvectors of $M^{(p)}$.
   6: end for
7: until convergence
8: for p=1 to m do
   9: transform $C^{(p)}$ into a cluster indicator matrix by the k-means.
10: end for
where $$M^{(p)} = w_b^{(p)}(F^{(p)}(F^{(p)})^T) + \sum_{p<j \leq m} w_q^{(pj)}\left((R^{(pj)}C^{(j)}(C^{(j)})^T(R^{(pj)})^T\right) + \sum_{1 \leq j < p} w_a^{(jp)}\left((R^{(jp)})^T C^{(j)}(C^{(j)})^T(R^{(jp)})\right) + \text{[Optional Terms]}.$$

where
- $C^{(p)}$ is the matrix representing cluster number p
- superscript T indicates the transform of a matrix
- $R^{(ij)}$ is a matrix indicating a relationship between a two data object $X_i$ and $X_j$
- j and p are index variables such that $1 \leq j$, $p \leq m$, $j \neq p$
- $F^{(p)}$ is a feature matrix relating to data object p
- m is the number of data objects being considered
- $w_b^{(p)}$ indicates an element of a weighting vector relating to the feature matrices
- $w_a^{(jp)}$ and $w_a^{(pj)}$ indicate elements of weighting matrices relating to clustering specified by a user Further General Discussion of the Invention Therefore, multi-type relational data has presented a great challenge for traditional clustering approaches. The present invention provides a general model, the collective factorization on related matrices, to discover the hidden structures susceptible of characterization by clusters, in the case of multiple types of objects—based on both feature information and relation information. By clustering the multiple types of objects simultaneously, the model performs adaptive dimensionality reduction for each type of data. Through the related factorizations which share factors, the hidden structures of different types of objects could interact under the model. In addition to the cluster structures for each type of data, the model also provides information about the relation between clusters of different types of objects.

Second, under this model, an algorithm is provided, which employs spectral relational clustering ("SRC"), to cluster multiple types of interrelated data objects simultaneously. By iteratively embedding each type of data objects into low dimensional spaces, the algorithm benefits from the interactions among the hidden structures of different types of data objects. The algorithm has the simplicity of spectral clustering approaches but at the same time is also applicable to relational data with various structures. Theoretical analysis and experimental results demonstrate the promise and effectiveness of the algorithm.

The present invention provides a system and method that employ a general model CFRM for clustering Multi-Type Relational Data (MTRD). The model is applicable to relational data with various structures. Under this model, an algorithm SRC is employed to cluster multi-type interrelated data simultaneously. SRC iteratively embeds each type of data objects into low dimensional spaces. Benefiting from the interactions among the hidden structures of different types of data objects, the iterative procedure amounts to adaptive dimensionality reduction and noise removal leading to better embeddings. Extensive experiments demonstrate the promise and effectiveness of SRC. The CFRM model and SRC algorithm provide a more general solution than prior spectral clustering algorithms, and thus permit relaxation of specific presumptions and limitations required thereby.

The present method may be readily implemented on general purpose computational hardware, such as a Windows Vista workstation, a Unix or Linux workstation, a Macintosh workstation, as known the in the art. Such workstations, or their server corresponding systems, are known to include a processor (which may be a single core, multiple core, or more generally a distributed processing system), cache memory (typically two levels), main random access memory, disk or flash storage for persistently holding program instructions and data, a user interface (typically a graphic user interface, but this is not required for the present invention), a data interface, which may be, for example, a network connection port (e.g., Ethernet, gigabit Ethernet, etc.). The output is generally passed through the same data interface as the input, though separate ports may be provided. The program instructions may be hosted on a tangible computer readable medium, such as a magnetic storage disk, however, the optimization algorithm need not be so limited. For example, the optimization may be represented as a set of constraints or relationships, or quantum mechanical representations, and thus are not limited, for example, to media containing binary codes readable by Von Neumann or Harvard Architecture processors.

It is noted that various aspects of the invention lend themselves to parallelism. That is, within the iterative processes, aspects of the computation may be distributed to various processors. On the other hand, typically one iteration may not commence until a prior one is complete, insinuating serial processing. However, it may be possible to provide partial solutions in advance of completion of an iteration to a subsequent processing stage, potentially permitting completion sooner.

More Theoretical Approach:

The present invention provides a system and method for collective clustering on multi-type relational data. Given m sets of data objects, $\chi_1 = \{x_{11}, \ldots, x_{1n_1}\}, \ldots, \chi_1 = \{x_{m1}, \ldots, x_{mn_m}\}$, which refer to m different types of objects relating to each other, the invention simultaneously clusters $\chi_1$ into $k_1$ disjoint clusters, . . . , and $\chi_m$ into $k_m$ disjoint clusters.

To derive a general model for collective clustering, we first formulate Multi-Type Relational Data (MTRD) as a set of related matrices, in which two matrices are related in the sense that their row indices or column indices refer to the same set of objects. First, if there exist relations between $\chi_j$ and $\chi_j$ (denoted as $\chi_i \sim \chi_j$), we represent them as a relation matrix $R^{(ij)} \in \mathbb{R}^{n_i \times n_j}$, where an element $R_{pq}^{(ij)}$ denotes the relation between $\chi_{ip}$ and $\chi_{jq}$. Second, a set of objects $\chi_i$ may have its own features, which could be denoted by a feature matrix $F^{(i)} \in \mathbb{R}^{n_i \times f_i}$, where an element $F_{pq}^{(i)}$ denotes the $q^{th}$ feature values for the object $\chi_{ip}$ and $f_i$ is the number of features for $\chi_j$. Derivation of the features is in accordance with the prior art and beyond the scope of this document.

Figure 5:
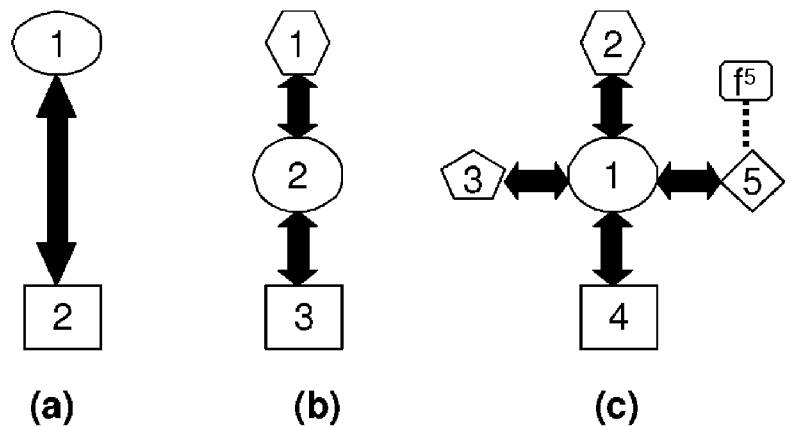
FIGS. 5A, 5B, and 5C show various examples of the structures of multi-type relational data.

FIGS. 5A, 5B and 5C show three examples of the structures of MTRD. FIG. 5A refers to a basic bi-type of relational data denoted by a relation matrix $R^{(12)}$, such as word-document data. FIG. 5B represents a tri-type of star-structured data, such as Web pages, Web users and search queries in Web search systems, which are denoted by two relation matrices $R^{(12)}$ and $R^{(23)}$. FIG. 5C represents the data consisting of shops, customers, suppliers, shareholders and advertisement media, in which customers (type 5) have features. The data are denoted by four relation matrices $R^{(12)}$, $R^{(13)}$, $R^{(14)}$, and $R^{(15)}$, and one feature matrix $F^{(5)}$.

It has been shown that the hidden structure of a data matrix can be explored by its factorization (D. D. Lee & H. S. Seung, 1999; Long et al., 2005). Motivated by this observation, the present invention provides a general model for collective clustering, which is based on factorizing the multiple related matrices. In MTRD, the cluster structure for a type of object x, may be embedded in multiple related matrices; hence it can be exploited in multiple related factorizations. First, if $\chi_i \sim \chi_j$, then the cluster structures of both $\chi_i$ and $\chi_j$ are reflected in the triple factorization of their relation matrix $R^{(ij)}$ such that $R^{(ij)} \approx C^{(i)} A^{(ij)} (C^{(j)})^T$ (Long et al., 2005), where $C^{(i)} \in \{0,1\}^{n_i \times k_i}$ is a cluster indicator matrix for $\chi_i$ such that $\Sigma_{q=1}^{k_i} C_{pq}^{(i)} = 1$ and $C_{pq}^{(i)}$ denotes that the $p^{th}$ object in $\chi_j$ is associated with the $q^{th}$ cluster. Similarly $C^{(j)} \in \{0,1\}^{n_j \times k_j}$. $A^{(ij)} \in \mathbb{R}^{k_i \times k_j}$ is the cluster association matrix such that $A_{pq}^{ij}$ denotes the association between cluster p of $\chi_i$ and cluster q of $\chi_j$. Second, if $\chi_i$ has a feature matrix $F^{(i)} \in \mathbb{R}^{n_i \times f_i}$, the cluster structure is reflected in the factorization of $F^{(i)}$ such that $F^{(i)} \approx C^{(i)} B^{(i)}$, where $C^{(i)} \in \{0, 1\}^{n_i \times k_i}$ is a cluster indicator matrix, and $B^{(i)} \in \mathbb{R}^{k_i \times f_i}$ is the feature basis matrix which consists of $k_i$ basis (cluster center) vectors in the feature space.

Based on the above discussions, the task of collective clustering on MTRD is formulated as the following optimization problem. Considering the most general case, we assume that in MTRD, every pair of $\chi_i$ and $\chi_j$ is related to each other and every x, has a feature matrix $F^{(i)}$.

The Collective Factorization on Related Matrices (CFRM) model provides as follows. Given m positive numbers $\{k_i\}_{1 \leq i \leq j \leq m}$, and MTRD $\{\chi_1, \ldots, \chi_m\}$, which is described by a set of relation matrices $\{R^{(ij)} \in \mathbb{R}^{n_i \times n_j}\}_{1 \leq i \leq j \leq m}$, a set of feature matrices $\{F^{(ij)} \in \mathbb{R}^{n_i \times f_i}\}_{1 \leq i \leq m}$, as well as a set of weights $w_a^{(ij)}$, $w_b^{(i)} \in \mathbb{R}_+$ for different types of relations and features, the task of the collective clustering on the MTRD is to minimize L, $$L = \sum_{1 \leq i \leq j \leq m} w_a^{(ij)} \|R^{(ij)} - C^{(i)} A^{(ij)} (C^{(j)})^T\|^2 + \sum_{1 \leq i \leq m} w_b^{(i)} \|F^{(i)} - C^{(i)} B^{(i)}\|^2 \quad (1)$$

w.r.t. $C^{(i)} \in \{0,1\}^{n_i \times k_i}$, $A^{(ij)} \in \mathbb{R}^{k_i \times k_j}$, and $B^{(i)} \in \mathbb{R}^{k_i \times f_i}$ subject to the constraints: $\Sigma_{q=1}^{k_i} C_{pq}^{(i)} = 1$ where $1 \leq p \leq n_i$, $1 \leq i \leq j \leq m$, and $\|\cdot\|$ denotes the Frobenius norm for a matrix.

The CFRM model clusters multi-type interrelated data simultaneously based on both relation and feature information. The model exploits the interactions between the hidden structures of different types of objects through the related factorizations which share matrix factors, i.e., cluster indicator matrices. Hence, the interactions between hidden structures work in two ways. First, if $\chi_i \sim \chi_j$, the interactions are reflected as the duality of row clustering and column clustering in $R^{(ij)}$. Second, if two types of objects are indirectly related, the interactions pass along the relation "chains" by a chain of related factorizations, i.e., the model is capable of dealing with influence propagation. In addition to local cluster structure for each type of object, the model also provides the global structure information by the cluster association matrices, which represent the relations among the clusters of different types of objects.

A spectral clustering algorithm for MTRD under the CFRM model is provided as follows. First, without loss of generality, we re-define the cluster indicator matrix $C^{(i)}$ as the following vigorous cluster indicator matrix, $$C_{pq}^{(i)} = \begin{cases} \dfrac{1}{|\pi_q^{(i)}|^{\frac{1}{2}}} & \text{if } x_{ip} \in \pi_q^{(i)} \\ 0 & \text{otherwise} \end{cases}$$

where $|\pi_q^{(i)}|$ denotes the number of objects in the $q^{th}$ cluster of $\chi^{(i)}$. Clearly $C^{(i)}$ still captures the disjoint cluster memberships and $(C^{(i)})^T C^{(i)} = I_{k_i}$ where $I_{k_i}$ denotes $k_i \times k_i$ identity matrix. Hence our task is the minimization:

$$\min_{\substack{\{(C^{(i)})^T C^{(i)} = I_{k_i}\}_{1 \leq i \leq m} \\ \{A^{(ij)} \in \mathbb{R}^{k_i \times k_j}\}_{1 \leq i \leq j \leq m} \\ \{B^{(i)} \in \mathbb{R}^{k_i \times f_i}\}_{1 \leq i \leq m}}} L \quad (2)$$

where L is the same as in Eq. (1).

If $\{C^{(i)}\}_{1 \leq i \leq m}$, $\{A^{(ij)}\}_{1 \leq i \leq j \leq m}$, and $\{B^{(i)}\}_{1 \leq i \leq m}$ are the optimal solution to Eq. (2), then for $1 \leq i \leq m$:

$$A^{(ij)} = (C^{(i)})^T R^{(ij)} C^{(j)} \quad (3)$$

$$A^{(i)} = (C^{(i)})^T F^{(i)} \quad (4)$$

The objective function in Eq. (2) can be expanded as follows.

$$L = \left( \sum_{1 \leq i \leq j \leq m} w_a^{(ij)} tr\left((R^{(ij)} - C^{(i)} A^{(ij)} (C^{(j)})^T)(R^{(ij)} - C^{(i)} A^{(ij)} (C^{(j)})^T)^T\right) \right) + \quad (5)$$

$$\sum_{1 \leq i \leq m} w_b^{(i)} tr\left((F^{(i)} - C^{(i)} B^{(i)})(F^{(i)} - C^{(i)} B^{(i)})^T\right)$$

$$= \sum_{1 \leq i \leq j \leq m} w_a^{(ij)} tr\left((R^{(ij)} R^{(ij)})^T\right) + tr\left(A^{(ij)} (A^{(ij)})^T\right) -$$

$$2tr\left(C^{(i)} A^{(ij)} (C^{(j)})^T (R^{(ij)})^T\right) + \sum_{1 \leq i \leq m} w_b^{(i)} tr\left(F^{(i)} (F^{(i)})^T\right) +$$

$$tr(B^{(i)} (B^{(i)})^T) - 2tr\left(C^{(i)} B^{(i)} (F^{(i)})^T\right)$$

where tr denotes the trace of a matrix; the terms $tr(A^{(ij)}(A^{(ij)})^T)$ and $tr(B^{(i)}(B^{(i)})^T)$ result from the communicative property of the trace and $(C^{(i)})^T(C^{(i)}) = I_{k_i}$. Based on Eq. (5), solving $$\frac{\partial L}{\partial A^{(ij)}} = 0 \text{ and } \frac{\partial L}{\partial B^{(i)}} = 0$$

leads to Eq. (3) and Eq. (4).

This implies that the objective function in Eq. (1) can be simplified to a function of only $C^{(i)}$. The minimization problem in Eq. (2) is equivalent to the following maximization problem:

$$\max_{\{(C^{(i)})^T C^{(i)} = I_{k_i}\}_{1 \leq i \leq m}} \sum_{1 \leq i \leq m} w_b^{(i)} tr\left((C^{(i)})^T F^{(i)} (F^{(i)})^T C^{(i)}\right) + \quad (6)$$

$$\sum_{1 \leq i \leq j \leq m} w_a^{(ij)} tr\left((C^{(i)})^T R^{(ij)} C^{(j)} (C^{(j)})^T (R^{(ij)})^T C^{(i)}\right)$$

If we plug Eq. (3) and (4) into Eq. (5), we obtain $$L = \left( \sum_{1 \leq i \leq m} w_b^{(i)} tr(F^{(i)} F^{(i)})^T - tr\left((C^{(i)})^T F^{(i)} (F^{(i)})^T C^{(i)}\right) \right) + \quad (7)$$

$$\sum_{1 \leq i \leq j \leq m} w_a^{(ij)} tr\left((R^{(ij)} R^{(ij)})^T\right) -$$

$$tr(C^{(i)})^T R^{(ij)} C^{(j)} (C^{(j)})^T (R^{(ij)})^T C^{(i)}).$$

Since in Eq. (7), $tr(F^{(i)}(F^{(i)})^T)$ and $tr(R^{(ij)}(R^{(ij)})^T)$ are constants, the minimization of L in Eq. (2) is equivalent to the maximization in Eq. (6).

The invention provides an iterative algorithm to determine the optimal (local) solution to the maximization problem, i.e., at each iterative step we maximize the objective function in Eq. (6) w.r.t. only one matrix $C^{(p)}$ and fix other $C^{(j)}$ for $j \neq p$ where $1 \leq p$, $j \leq m$. Based on Eq. (6), after a little algebraic manipulation, the task at each iterative step is equivalent to the following maximization, $$\max_{(C^{(p)})^T C^{(p)} = I_{k_p}} tr((C^{(p)})^T M^{(p)} C^{(p)}) \quad (8)$$

where $$M^{(p)} = w_b^{(p)}(F^{(p)}(F^{(p)})^T) + \sum_{p<j\leq m} w_a^{(pj)}((R^{(pj)}C^{(j)}(C^{(j)})^T(R^{(pj)})^T)) + \quad (9)$$

$$\sum_{1\leq j<p} w_a^{(jp)}((R^{(jp)})^T C^{(j)}(C^{(j)})^T(R^{(jp)})).$$

Clearly $M^{(p)}$ is a symmetric matrix. Since $C^{(p)}$ is a vigorous cluster indicator matrix, the maximization problem in Eq. (8) is still NP-hard. However, as in the spectral graph partitioning, if we apply real relaxation to $C^{(p)}$ to let $C^{(p)}$ be an arbitrary orthonormal matrix, it turns out that the maximization in Eq. (8) has a closed-form solution.

The Ky-Fan theorem provides that, if we let M be a symmetric matrix with Eigenvalues $\lambda_1 \geq \lambda_2 \geq \ldots \geq \lambda_k$, and the corresponding Eigenvectors $U=[u_1, \ldots, u_k]$, then $\sum_{i=1}^{k}\lambda_i = \max_{X^T X=I_k} tr(X^T M X)$. Moreover, the optimal X is given by $[u_1, \ldots, u_k]$ Q where Q is an arbitrary orthogonal matrix.

The Spectral Relational Clustering Algorithm operates with inputs representing:
Relation matrices $\{R^{(ij)} \in \mathbb{R}^{n_i \times n_j}\}_{1 \leq i \leq j \leq m}$,
feature matrices $\{F^{(i)} \in \mathbb{R}^{n_i \times f_i}\}_{1 \leq i \leq j \leq m}$,
numbers of clusters $\{k_i\}_{1 \leq i \leq m}$, and
weights $\{w_a^{(ij)}, w_b^{(i)} \in \mathbb{R}_+\}_{1 \leq i \leq j \leq m}$.

The algorithm produces an output representing Cluster indicator matrices $\{C^{(p)}\}_{1 \leq p \leq m}$. The method of the algorithm is indicated above at Algorithm 1

The algorithm therefore initializes $\{C^{(p)}\}_{1 \leq p \leq m}$ with orthonormal matrices, to provide the starting condition representing the inputs.

Then, an iterative process is performed as follows, until the result converges within a desired error bound. For each p, from 1 to m, the matrix $M^{(p)}$ is computed according to Eq. (9):

$$M^{(p)} = w_b^{(p)}(F^{(p)}(F^{(p)})^T) + \sum_{p<j\leq m} w_a^{(pj)}((R^{(pj)}C^{(j)}(C^{(j)})^T(R^{(pj)})^T)) + \quad (9)$$

$$\sum_{1\leq j<p} w_a^{(jp)}((R^{(jp)})^T C^{(j)}(C^{(j)})^T(R^{(jp)})).$$

and $C^{(p)}$ updated by the leading $k_p$ Eigenvectors of $M^{(p)}$.

After convergence, $C^{(p)}$ (for each p=1 to m) is transformed into a cluster indicator matrix by the k-means.

Based on the Ky-Fan theorem (Bhatia, 1997), at each iterative step we update OP) as the leading $k_p$ Eigenvectors of the matrix $M_{(p)}$. After the iteration procedure converges, since the resulting Eigen-matrices are not indicator matrices, we need to transform them into cluster indicator matrices by postprocessing (Bach & Jordan, 2004; Zha et al., 2002; Ding & He, 2004). For convenience, we may simply adopt the k-means for the postprocessing; however, it is understood that other methods may be employed to transform $C^{(p)}$ into a cluster indicator matrix without departing from the present invention.

The Spectral Relational Clustering (SRC), iteratively updates $C^{(p)}$ as the leading $k_p$ Eigenvectors of $M^{(p)}$, and makes use of the interactions among the hidden structures of different type of object. After the iteration procedure converges, the hidden structure for each type of object is embedded in an Eigen-matrix. Finally, we postprocess each Eigen-matrix to extract the cluster structure.

To illustrate the SRC algorithm, we describe the specific update rules for the tri-type relational data as shown in FIG. 5B:

update $C^{(1)}$ as the leading $k_1$ Eigenvectors of $w_a^{(12)} R^{(12)} C^{(2)} (C^{(2)})^T (R^{(12)})^T$;

update $C^{(2)}$ as the leading $k_2$ Eigenvectors of $w_a^{(12)} (R^{(12)})^T C^{(1)} (C^{(1)})^T R^{(12)} + w_a^{(23)} R^{(23)} C^{(3)} (C^{(3)})^T (R^{(23)})^T$; and update $C^{(3)}$ as the leading $k_3$ Eigenvectors of $w_a^{(23)} (R^{(23)})^T C^{(2)} (C^{(2)})^T R^{(23)}$.

The computational complexity of SRC can be shown to be $O(tmn^2 k)$ where t denotes the number of iterations, $n=\Theta(n_i)$ and $k=\Theta(k_i)$. For sparse data, it could be reduced to $O(tmzk)$ where z denotes the number of nonzero elements.

The convergence of SRC algorithm can be proven. The analysis of the minimization problem in Eq. (2) and Eq. (8) imply that the updates of the matrices in Line 5 of the Algorithm (Update $C^{(p)}$ by the leading $k_p$ Eigenvectors of $M^{(p)}$) increase the objective function in Eq. (6), and hence equivalently decrease the objective function in Eq. (2). Since the objective function in Eq. (2) has the lower bound 0, the convergence of SRC is guaranteed.

There are various special cases of the CFRM model and the SRC algorithm. Overall these cases show that SRC provides a superior and more flexible general approach to clustering than prior algorithms.

K-Means and Spectral Clustering

Traditional "flat" data can be viewed as a special MTRD with only one feature matrix. In this situation, the objective function of Eq. (1) is reduced to $L=\|F-CB\|^2$, which is the matrix representation for the objective function of the k-means algorithm (Zha et al., 2002). Therefore, k-means is equivalent to the maximization:

$$\max_{C^T C = I_k} tr(C^T F F^T C). \quad (10)$$

If we treat $FF^T$ as a graph affinity matrix, the above objective function is gives the same results as the objective function of graph partitioning based on average association cut (Shi & Malik, 2000). If we normalize F to be $D^{-1/2}F$ where $D=$diag $(FF^T e)$, $e=[1, 1, \ldots, 1]^T$, the objective function in Eq. (10) is gives the same results as the objective function of graph partitioning based on normalized cut (Shi & Malik, 2000). Other versions of graph partitioning can also be formulated to be Eq. (10). For the objective function in Eq. (10), SRC iterates only once to compute the leading k Eigenvectors of $FF^T$ and postprocesses them to extract the cluster structure. This is similar to the procedure described by Ng et al. (2001). Hence spectral clustering algorithms based on graph partitioning are naturally accommodated in the SRC algorithm.

However, the method and algorithm according to the present invention are more powerful, and permit a solution to a broader class of problems, without the limitations or presumptions required by the prior art.

If we consider $FF^T$ in Eq. (10) as a general similarity matrix which denotes similarities or relations within the same type of object, SRC is naturally extended to a more general case. In some applications, besides features and relations to other types of objects, a type of object $X^{(p)}$ in MTRD may have intra-type relations (here we assume undirected relations), which can be denoted by a symmetric matrix $S^{(p)} \in \mathbb{R}^{n_p \times n_p}$. By treating $S^{(p)}$ the same as $F^{(p)}(F^{(p)})^T$, it is easy to extend SRC to this situation by simply adding an extra term $w_s^{(p)}S^{(p)}$ to $M^{(p)}$ in Eq. (9), where $w_s^{(p)} \in \mathbb{R}$ denotes the weight for $S^{(p)}$:

$$M^{(p)} = w_b^{(p)}\left(F^{(p)}(F^{(p)})^T\right) + \sum_{p<j\le m} w_a^{(pj)}\left((R^{(pj)}C^{(j)}(C^{(j)})^T(R^{(pj)T})\right) + \sum_{1\le j<p} w_a^{(jp)}\left((R^{(jp)})^T C^{(j)}(C^{(j)})^T(R^{(jp)})\right) + w_s^{(p)}S^{(p)}. \quad (9)'$$

Bipartite Spectral Graph Partitioning

Bipartite Spectral Graph Partitioning (BSGP) (Dhillon, 2001; H. Zha & H. Simon, 2001) was proposed to co-cluster bi-type relational data, which can be denoted as one relation matrix $R^{(p)} \in \mathbb{R}^{n_j \times n_2}$, such as word-document co-occurrence matrix. The BSGP formulates the data as a bipartite graph, whose adjacency matrix can be written as $$\begin{bmatrix} 0 & R \\ R^T & 0 \end{bmatrix}$$

After the deduction, spectral partitioning on the bipartite graph is converted to a singular value decomposition (SVD) (Dhillon, 2001; H. Zha & H. Simon, 2001). Under the CFRM model, clustering on bi-type relational data is equivalent to $$\min_{\substack{(C^{(1)})^T C^{(1)} = I_{k_1} \\ (C^{(2)})^T C^{(2)} = I_{k_2}}} \|R - C^{(1)}A(C^{(2)})^T\|^2 \quad (11)$$

BSGP has the restriction that clusters of different types of objects must have one-to-one associations. Under the CFRM model, this is equivalent to adding an extra constraint on cluster association matrix A to let A be a k×k diagonal matrix. It immediately follows from the standard result of linear algebra (G. Golub & Loan, 1989) that the minimization in Eq. (11) with the diagonal constraint on A is gives the same results as partial singular value decomposition (SVD). Hence, the CFRM model provides a simple way to understand BSGP. Moreover, since in SRC according to the present invention imposes no constraints on A, it provides a co-clustering algorithm which does not require that different types of objects have equal number of clusters and one-to-one cluster associations.

Experimental Results

The effectiveness of the SRC algorithm on two types of MTRD, bi-type relational data and tri-type star-structured data as shown in FIGS. 5A and 5B, which represent two basic structures of MTRD and arise frequently in real applications, were analyzed.

The data sets used in the experiments are mainly based on the 20-Newsgroup data (Lang, 1995) which contains about 20,000 articles from 20 newsgroups. We pre-process the data by removing stop words and file headers and selecting the top 2000 words by the mutual information. The word document matrix R is based on tf.idf and each document vector is normalized to the unit norm vector. In the experiments the classic k-means is used for initialization and the final performance score for each algorithm is the average of the 20 test runs unless stated otherwise.

Clustering on Bi-Type Relational Data

Experiments were conducted on a bi-type relational data, word-document data, to demonstrate the effectiveness of SRC as a novel co-clustering algorithm. A representative spectral clustering algorithm, Normalized-Cut (NC) spectral clustering (Ng et al., 2001; Shi & Malik, 2000), and BSGP (Dhillon, 2001), are used as comparisons.

The graph affinity matrix for NC is $R^T R$, i.e., the cosine similarity matrix. In NC and SRC, the leading k Eigenvectors are used to extract the cluster structure, where k is the number of document clusters. For BSGP, the second to the ($\lceil \log_2 k \rceil + 1$)th leading singular vectors are used (Dhillon, 2001). K-means is adopted to postprocess the Eigenvectors.

Before postprocessing, the Eigenvectors from NC and SRC are normalized to the unit norm vector and the Eigenvectors from BSGP are normalized as described by Dhillon (2001). Since all the algorithms have random components resulting from k-means or itself, at each test we conduct three trials with random initializations for each algorithm and the optimal one provides the performance score for that test run. To evaluate the quality of document clusters, we elect to use the Normalized Mutual Information (NMI) (Strehl & Ghosh, 2002), which is a standard way to measure the cluster quality.

At each test run, five data sets, multi2 (NG 10, 11), multi3 (NG 1, 10, 20), multi5 (NG 3, 6, 9, 12, 15), multi8 (NG 3, 6, 7, 9, 12, 15, 18, 20) and multi10 (NG 2, 4, 6, 8, 10, 12, 14, 16, 18, 20), are generated by randomly sampling 100 documents from each newsgroup. Here NG i means the ith newsgroup in the original order. For the numbers of document clusters, we use the numbers of the true document classes. For the numbers of word clusters, there are no options for BSGP, since they are restricted to equal to the numbers of document clusters. For SRC, it is flexible to use any number of word clusters. The selection of an optimal number of word clusters may be determined empirically, or by other means. However, we can simply choose one more word clusters than the corresponding document clusters, i.e., 3, 4, 6, 9, and 11. This may not be the best choice but it is good enough to demonstrate the flexibility and effectiveness of SRC.

Figure 6:
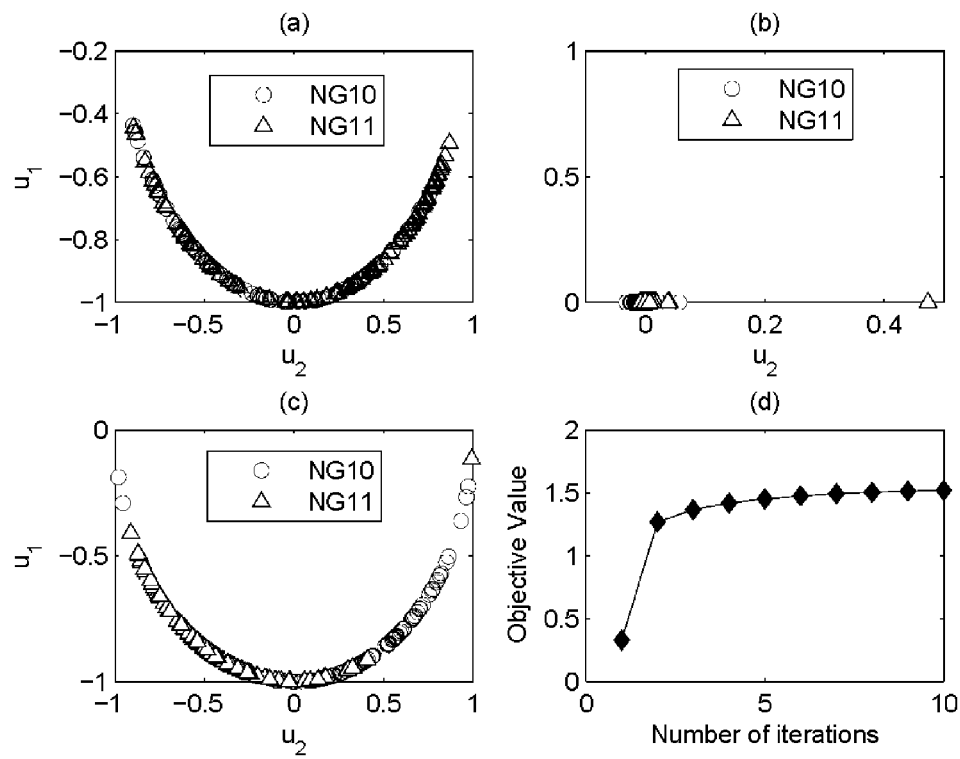
FIGS. 6A, 6B, and 6C show document embeddings of multi2 data set produced by NC, BSGP and SRC, respectively.
FIG. 6D is an iteration curve for SRC according to FIG. 6C.

In FIGS. 6A, 6B and 6C, three document embeddings of a multi2 sample are shown, for NC, BSGP, and SRC, respectively. This sample is from two close newsgroups, rec.sports.baseball and rec.sports.hockey. These figures show results in eigen space, as taught by Dhillon, cited above.

In this example, when NC and BSGP fail to separate the document classes, SRC still provides a satisfactory separation. Separation is shown in the figures where data points in one cluster are shown as light circles and from another cluster are shown as dark squares. One possible explanation for this is that the adaptive interactions among the hidden structures of word clusters and document clusters remove the noise, and lead to better embeddings. FIG. 6D shows reaching convergence in a typical run of the SRC algorithm. The objective value is the trace value in the minimization of Eq. (2), e.g., Eq. (8).

TABLE 1

NMI comparisons of SRC, NC and BSGP algorithms

| DATA SET | SRC | NC | BSGP |
|---|---|---|---|
| MULTI2 | 0.4979 | 0.1036 | 0.1500 |
| MULTI3 | 0.5763 | 0.4314 | 0.4897 |
| MULTI5 | 0.7242 | 0.6706 | 0.6118 |
| MULTI8 | 0.6958 | 0.6192 | 0.5096 |
| MULTI10 | 0.7158 | 0.6292 | 0.5071 |

Table 1 shows NMI scores on all the data sets. We observe that SRC performs better than NC and BSGP on all data sets. In this rubric, a perfect score is one. This verifies the hypothesis that benefiting from the interactions of the hidden structures of different types of objects, the SRC's adaptive dimensionality reduction has advantages over the dimensionality reduction of the existing spectral clustering algorithms.

Clustering on Tri-Type Relational Data

Experiments were also conducted on tri-type star structured relational data to evaluate the effectiveness of SRC in comparison with other two algorithms for MTRD clustering. These other algorithms were not spectral clustering algorithms, but did work with MTRD. One is based on m-partite graph partitioning, Consistent Bipartite Graph Co-partitioning (CBGC) (Gao et al., 2005), which was tested using an executable program of CBGC graciously provided by the authors thereof. The other is Mutual Reinforcement K-means (MRK), which is implemented based on the idea of mutual reinforcement clustering as discussed above.

The first data set is synthetic data, in which two relation matrices, $R^{(12)}$ with 80-by-100 dimension and $R^{(23)}$ with 100-by-80 dimension, are binary matrices with 2-by-2 block structures. $R^{(12)}$ is generated based on the block structure $$\begin{bmatrix} 0.9 & 0.7 \\ 0.8 & 0.9 \end{bmatrix},$$

i.e., the objects in cluster 1 of $\chi^{(1)}$ is related to the objects in cluster 1 of $\chi^{(2)}$ with probability 0.9, etc. $R^{(23)}$ is generated based on the block structure $$\begin{bmatrix} 0.6 & 0.7 \\ 0.7 & 0.6 \end{bmatrix}.$$

Each type of object has two equal size clusters. It is not a trivial task to identify the cluster structure of this data, since the block structures are subtle. We denote this data as Binary Relation Matrices (TRM) data.

The other three data sets are built based on the 20-newsgroups data for hierarchical taxonomy mining and document clustering. In the field of text categorization, hierarchical taxonomy classification is widely used to obtain a better tradeoff between effectiveness and efficiency than flat taxonomy classification. To take advantage of hierarchical classification, one must mine a hierarchical taxonomy from the data set. We can see that words, documents and categories formulate a tri-type relational data, which consists of two relation matrices, a word-document matrix $R^{(12)}$ and a document-category matrix $R^{(23)}$ (Gao et al., 2005).

The true taxonomy structures for three data sets, TM1, TM2 and TM3, are listed in Table 2. For example, TM1 data set is sampled from five categories, in which NG10 and NG11 belong to the same high level category res.sports and NG17, NG18 and NG19 belong to the same high level category talk.politics. Therefore, for the TM1 data set, the expected clustering result on categories should be {NG10, NG11} and {NG17, NG18, NG19} and the documents should be clustered into two clusters according to their categories.

TABLE 2

Taxonomy structures for three data sets

| DATA SET | TAXONOMY STRUCTURE |
|---|---|
| TM1 | {NG10, NG11}, {NG17, NG18, NG19} |
| TM2 | {NG2, NG3}, {NG8, NG9}, {NG12, NG13} |
| TM3 | {NG4, NG5}, {NG8, NG9}, {NG14, NG15}, {NG17, NG18} |

Figure 7:
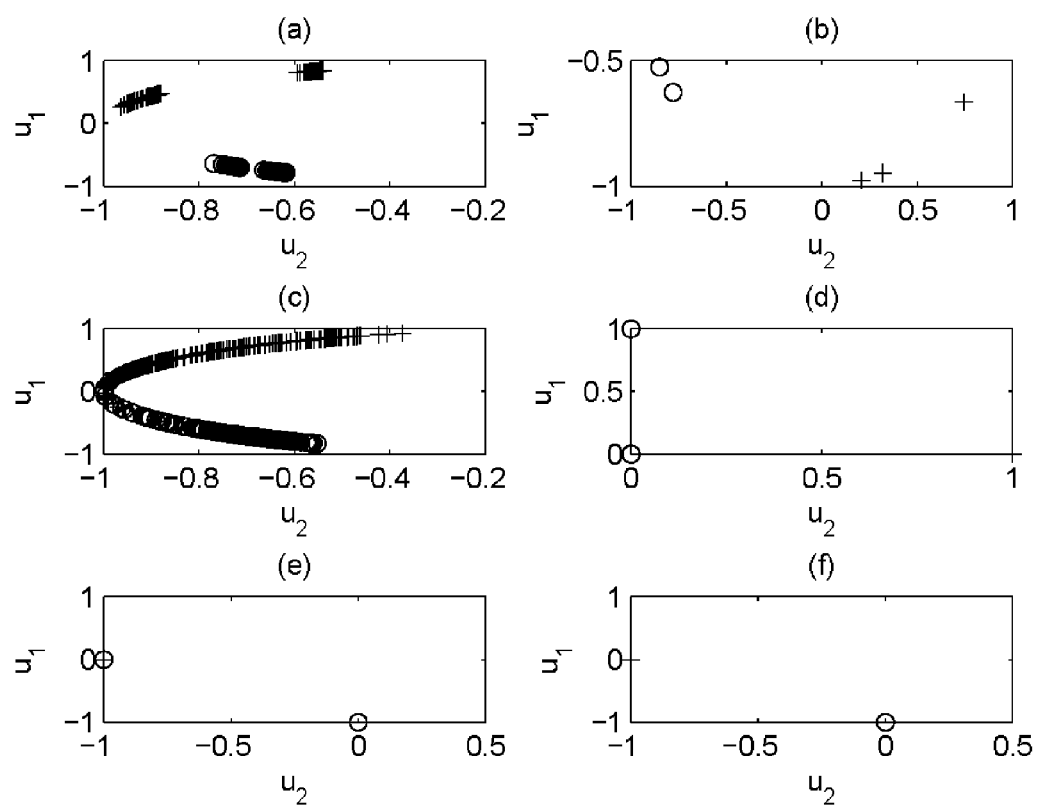
FIGS. 7A, 7B, 7C, 7D, 7E, and 7F show three pairs of embeddings of documents and categories for the TM1 data set produced by SRC with different weights.

The documents in each data set are generated by sampling 100 documents from each category. The number of clusters used for documents and categories are 2, 3 and 4 for TM1, TM2 and TM3, respectively. For the number of word clusters, we adopt the number of categories, i.e., 5, 6 and 8. For the weights $w_a^{(12)}$ and $w_a^{(23)}$, we simply use equal weight, i.e., $w_a^{(12)}=w_a^{(23)}=1$. FIG. 7 illustrates the effects of different weights on embeddings of documents and categories. When $w_a^{(12)}=w_a^{(23)}=1$, i.e., SRC makes use of both word-document relations and document-category relations, both documents and categories are separated into two clusters very well as in FIGS. 7A and 7B, respectively; when SRC makes use of only the word-document relations, the documents are separated with partial overlapping as in FIG. 7C and the categories are randomly mapped to a couple of points as in FIG. 7D; when SRC makes use of only the document-category relations, both documents and categories are incorrectly overlapped as in FIGS. 7E and 7F, respectively, since the document-category matrix itself does not provide any useful information for the taxonomy structure.

TABLE 3

NMI comparisons of SRC, MRK and CBGC algorithms

| DATA SET | SRC | MRK | CBGC |
|---|---|---|---|
| BRM | 0.6718 | 0.6470 | 0.4694 |
| TM1 | 1 | 0.5243 | — |
| TM2 | 0.7179 | 0.6277 | — |
| TM3 | 0.6505 | 0.5719 | — |

The performance comparison is based on the cluster quality of documents, since the better it is, the more accurate we can identify the taxonomy structures. Table 3 shows NMI comparisons of the three algorithms on the four data sets. The NMI score of CBGC is available only for BRM data set because the CBGC program provided by the authors only works for the case of two clusters and small size matrices. We observe that SRC performs better than MRK and CBGC on all data sets. The comparison shows that among the limited efforts in the literature attempting to cluster multiple types of interrelated objects simultaneously, SRC is an effective one to identify the cluster structures of MTRD.

Advertising

Some of the elements in a data object may represent advertising, e.g., an object whose purpose is to provide commercial information for the purpose of promoting a commercial transaction or act, and whose placement is sponsored, for example by the payment of a sponsorship fee. In such a case, the algorithm may cluster that advertising with other content, based on the feature and relationship matrices, by putting advertising in the same cluster with that other content. Initialization of the feature and relationship matrices may be automatic in the case of other types of data; however, in the case of advertising, the advertiser may have a particular wish to provide at least some feature and/or relationship matrix information to inform clustering of the advertising with other content.

Advertisers, i.e., the sponsors of advertisements, are generally willing to pay more to deliver an impression (e.g., a banner ad or other type of advertisement) to users who are especially sensitive to advertisements for their products or are seeking to purchase products corresponding to those sold by the advertisers, and the economic model often provides greater compensation in the event of a "click through", which is a positive action taken by the user to interact with the ad to receive further information.

The value of an advertisement is ultimately dependent on results, typically sales. Surrogate benchmarks are often used, since the tracking of an advertisement to a particular result or transaction may be difficult. Likewise, in some cases, an advertisement may not be intended to promote a transaction, but to promote consumer awareness or actions. The actual cost of rendering an advertisement is often unrelated to the value of a sale, and may be determined competitively with respect to other advertisements seeking the same placement. Thus, the cost of an advertisement may be dependent on the opportunity cost of delivery (alternate/competing advertisements of use of resources), and user perception and response to the advertisement. Therefore, it may be useful to classify the target audience as distinct from the context of the usage. Likewise, it is often useful to classify the context of usage to determine relevance, to optimize the ad placement.

The present invention therefore has a number of applications for advertisement placement—first, the classification of members of the audience, based on data sets which may include past activities, demographics, purchasing patterns, etc, in addition to immediate or current activities; second, correlating the context of a usage with the content of or targeting information for the advertisement; and third, classifying the content of an advertisement, or indeed, to help define the content so that the advertisement will be classified with desired content by a content-sensitive clustering or classification algorithm. The present invention may have application in both data mining of structured databases, and with unstructured object database retrieval applications.

U.S. Pat. No. 5,844,305, expressly incorporated herein by reference, relates to a system and method for extracting highly correlated elements (a "categorical cluster") from a body of data. It is generally understood that the data includes a plurality of records, the records contain elements from among a set of common fields, the elements have respective values, and some of the values are common to different ones of the records. In an initialization step, for each of the elements in the records, an associated value, having an initial value, is assigned. Then, a computation is performed, to update the associated values based on the associated values of other elements. The computation is preferably iteratively to produce the next set of updated values. After the computation is completed, or after all the desired iterations are completed, the final results, i.e., the updated associated values are used to derive a categorical cluster rule. The categorical cluster rule provides the owner of the data with advantageously useful information from the data.

Collaborative filtering is a process that seeks to determine common habits for a group of individuals having a common characteristic. The information may be commercially valuable, for example, because based on knowledge of what a consumer has purchased, it is possible to statistically predict what else he or she might buy, and to suggest such a purchase to the consumer. This collaborative filtering is preferably used in conjunction with a past history of the user himself, providing a powerful tool for predicting consumer behavior and preferences. Often, critical issues in the usefulness of such a system are the clustering of the population as a whole into groups, and assignment of a new individual to a group based on possibly limited data. The present invention therefore provides potential advantages in such systems.

Collaborative filtering is often used in systems that continuously present new things to their users, such as film recommending systems and personally adapted news. If the user does not like one suggestion from the system, he or she tells the system that this material is not interesting and the user profile is updated. Typically, the weight afforded to adaptive features is low, and indeed the feedback from one user is just one input to the system, and thus will typically not cause a major change in the user profile, since most of it still is valid. Therefore, in accordance with the present invention, the use may be provided with an ability to control a clustering, by adding, deleting, or modifying vectors, or by providing one or more supplemental vectors.

Also incorporated by reference is U.S. patent application Ser. No. 11/467,901, now U.S. Pat. No. 7,530,020.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The disclosure herein is intended to encompass all combinations, subcombinations, and permutations of the various options, elements and steps disclosed herein, to the extent consistent, and is not to be deemed limited to particular combinations, or groups thereof, defined by the embodiments.

REFERENCES

Bach, F. R., & Jordan, M. I. (2004). Learning spectral clustering. *Advances in Neural Information Processing Systems* 16.

Banerjee, A., Dhillon, I. S., Ghosh, J., Merugu, S., & Modha, D. S. (2004). A generalized maximum entropy approach to bregman co-clustering and matrix approximation. *KDD* (pp. 509-514).

Bhatia, R. (1997). *Matrix analysis*. New York: Springer-Verlag.

Chan, P. K., Schlag, M. D. F., & Zien, J. Y. (1993). Spectral k-way ratio-cut partitioning and clustering. *DAC '93* (pp. 749-754).

D. D. Lee, & H. S. Seung (1999). Learning the parts of objects by non-negative matrix factorization. *Nature*, 401, 788-791.

Dhillon, I. S. (2001). Co-clustering documents and words using bipartite spectral graph partitioning. *KDD* (pp. 269-274).

Dhillon, I. S., Mallela, S., & Modha, D. S. (2003). Information theoretic co-clustering. *KDD '03* (pp. 89-98).

Ding, C., He, X., & Simon, H. (2005). On the equivalence of nonnegative matrix factorization and spectral clustering. *SDM '05*.

Ding, C. H. Q., & He, X. (2004). Linearized cluster assignment via spectral ordering. *ICML*.

Ding, C. H. Q., He, X., Zha, H., Gu, M., & Simon, H. D. (2001). A min-max cut algorithm for graph partitioning and data clustering. *Proceedings of ICDM* 2001 (pp. 107-114).

El-Yaniv, R., & Souroujon, O. (2001). Iterative double clustering for unsupervised and semi-supervised learning. *ECML* (pp. 121-132).

Gao, B., Liu, T.-Y., Zheng, X., Cheng, Q.-S., & Ma, W.-Y. (2005). Consistent bipartite graph co-partitioning for star-structured high-order heterogeneous data co-clustering. *KDD '05* (pp. 41-50).

G. Golub, & Loan, C. (1989). *Matrix computations*. Johns Hopkins University Press.

Hofmann, T. (1999). Probabilistic latent semantic analysis. *Proc. of Uncertainty in Artificial Intelligence, UAI'99*. Stockholm.

Hofmann, T., & Puzicha, J. (1999). Latent class models for collaborative filtering. *IJCAI'99*. Stockholm.

H. Zha, C. Ding, M. X., & H. Simon (2001). Bi-partite graph partitioning and data clustering. *ACM CIKM '01*.

Lang, K. (1995). News weeder: Learning to filter netnews. *ICML*.

Li, T. (2005). A general model for clustering binary data. *KDD '05*.

Long, B., Zhang, Z. M., & Yu, P. S. (2005). Co-clustering by block value decomposition. *KDD '05*.

Ng, A., Jordan, M., & Weiss, Y. (2001). On spectral clustering: Analysis and an algorithm. *Advances in Neural Information Processing Systems* 14.

R. O. Duda, P. E. Hart, & D. G. Stork. (2000). *Pattern classification*. New York: John Wiley & Sons.

Shi, J., & Malik, J. (2000). Normalized cuts and image segmentation. *IEEE Transactions on Pattern Analysis and Machine Intelligence*, 22, 888-905.

Strehl, A., & Ghosh, J. (2002). Cluster ensembles—a knowledge reuse framework for combining partitionings. *AAAI 2002* (pp. 93-98). AAAI/MIT Press.

Taskar, B., Segal, E., & Koller, D. (2001). Probabilistic classification and clustering in relational data. *Proceeding of IJCAI-01*.

Tishby, N., Pereira, F., & Bialek, W. (1999). The information bottleneck method. *Proceedings of the 37-th Annual Allerton Conference on Communication, Control and Computing* (pp. 368-377).

Wang, J., Zeng, H., Chen, Z., Lu, H., Tao, L., & Ma, W.-Y. (2003). Recom: reinforcement clustering of multi-type interrelated data objects. *SIGIR '03* (pp. 274-281).

Zeng, H.-J., Chen, Z., & Ma, W.-Y. (2002). A unified framework for clustering heterogeneous web objects. *WISE '02* (pp. 161-172).

Zha, H., Ding, C., Gu, M., He, X., & Simon, H. (2002). Spectral relaxation for k-means clustering. *Advances in Neural Information Processing Systems*, 14.

What is claimed is:

1. A method of clustering data, comprising the steps of:
   (a) providing a set of first matrices relating to at least three types of objects, each respective first matrix comprising a set of features and a set of respective relations with respect to other objects;
   (b) automatically generating a second matrix, with at least one automated processor, comprising a set of values, which maximizes an objective function of the sets of first matrices, features and relations; and
   (c) automatically transforming each second matrix into a cluster indicator matrix, with at least one automated processor,
   wherein the second matrix is a function of at least:
   the set of first matrices, representing respective relations between distinct objects as members of m sets to be clustered into $k_p$ disjoint clusters, where p is an index running from 1 to m;
   at least one feature matrix denoting feature values for an associated object;
   a plurality of tentative cluster characterization matrices; and
   a set of weights for different types of relations and features.

2. The method of claim 1, wherein the matrices in the set of first matrices are orthonormal.

3. The method of claim 1, wherein the second matrix is symmetric.

4. The method of claim 1, wherein the sets of features and relations are embodied as third and fourth sets of matrices respectively.

5. The method of claim 1, wherein at least one of the cluster indicator matrix associates an advertising object with other objects by placing the advertising objects in the same cluster with the other data, dependent on features and relations of the advertising objects.

6. A method for uncovering hidden structures in data embodied on a storage device, comprising executing operations implementing a spectral clustering algorithm on at least one automated computer, the operations comprising:
   characterizing clustering of data of at least first, second, and third types using first, second and third tentative cluster characterization matrices, respectively; and
   iteratively improving each tentative cluster characterization matrix using linear combinations of other matrices, the other matrices characterizing relationships between data of different types,
   wherein iteratively improving comprises calculating a matrix $M^{(P)}$, which is a function of at least:
   at least one relation matrix representing respective relations between distinct members of m sets to be clustered into $k_p$ disjoint clusters, where p is an index running from 1 to m;
   at least one feature matrix where each element denotes a feature value for an associated data object;
   the tentative cluster characterization matrices; and
   a set of weights for different types of relations and features.

7. The method of claim 6, wherein during each iteration, a tentative cluster matrix is updated as the k leading eigenvectors of the linear combinations.

8. The method of claim 6, wherein the other matrices that are used to improve the first tentative cluster characterization matrix comprise at least one of the second and third tentative cluster characterization matrices.

9. The method of claim 6, wherein the other matrices used to improve the first tentative cluster indication matrix include a transpose of at least one of the second and third tentative cluster indication matrices.

10. The method of claim 6, wherein the other matrices comprise at least one of: feature matrices, weight matrices, and relationship matrices.

11. The method of claim 6, wherein the operations further comprise using the k-means algorithm to transform the tentative cluster characterization matrices into cluster indicator matrices.

12. The method of claim 6, wherein at least one of the cluster matrices associates advertising data with other data by placing the advertising in the same cluster with the other data.

13. The method of claim 12, wherein the method further makes use of feature or relationship data provided by an advertiser to inform clustering of the advertising data with the other data.

14. A method of clustering data, comprising the steps of:
   (a) providing a data matrix representing a set of objects, the set comprising at least three different types of objects, each object having an associated feature matrix and an associated relation matrix, representing respective relations with other objects of the at least three different types;

(b) collectively factorizing the data matrix, feature matrices and relation matrices, to discover hidden structures of the set of objects based on both feature information and relation information;

(c) generating a symmetric matrix comprising a set of weights, which maximizes an objective function of the data matrix, feature matrices and relation matrices; and (d) deriving a set of cluster indicator matrices based on the collective factorization, to achieve adaptive dimensionality reduction for each of the different types of object, wherein the symmetric matrix is a function of at least:

the data matrix, representing respective relations between distinct objects as members of a plurality of sets to be clustered into disjoint clusters;

at least one feature matrix denoting feature values for an associated object;

a plurality of tentative cluster characterization matrices; and a set of weights for different types of relations and features.

15. The method according to claim 14, wherein the set of cluster indicator matrices are iteratively improved to effect a spectral clustering of the set of objects.

16. The method according to claim 14, wherein at least a portion of the objects comprise web page content, and another portion of the objects comprise advertisements, and the set of cluster indicator matrices are derived in dependence on at least hidden structures relating the at least three different types of objects.

17. The method according to claim 14, further comprising:
characterizing clustering of the at least three different types of objects using at least three different tentative cluster characterization matrices, respectively; and
iteratively improving each tentative cluster characterization matrix using linear combinations of the associated feature matrix and the associated relation matrix other matrices.

18. The method according to claim 17, wherein during each iteration, a tentative cluster matrix is updated as the k leading eigenvectors of the linear combinations.

19. The method according to claim 14, wherein the objective function comprises:

$$\max_{\{(C^{(i)})^T C^{(i)} = I_{k_i}\}_{1 \le i \le m}} \sum_{1 \le i \le m} w_b^{(i)} tr\left((C^{(i)})^T F^{(i)} (F^{(i)})^T C^{(i)}\right) + \sum_{1 \le i \le j \le m} w_a^{(ij)} tr\left((C^{(i)})^T R^{(ij)} C^{(j)} (C^{(j)})^T (R^{(ij)})^T C^{(i)}\right)$$

subject to the constraints:

$$\sum_{q=1}^{k_i} C_{pq}^{(i)} = 1, \ 1 \le i \le j \le m,$$

where:
$C^{(i)} \in \{0,1\}^{n_i \times k_i}$ is a cluster indicator matrix for data object $\chi_i$ such that $$\sum_{q=1}^{k_i} C_{pq}^{(i)} = 1$$

and $C_{pq}^{(i)}$ denotes that the $p^{th}$ object in $\chi_i$ is associated with the $q^{th}$ cluster of $k_i$ number of clusters;

$R^{(ij)} \in \mathbb{R}^{n_i \times n_j}$ is a set of relation matrices;

$F^{(i)} \in \mathbb{R}^{n_i \times f_i}$ is a feature matrix of $\chi_j$, the cluster structure of which being reflected in the factorization of $F^{(i)}$ such that $F^{(i)} \approx C^{(i)} B^{(i)}$;

$B^{(i)} \in \mathbb{R}^{k_i \times f_i}$ is the feature basis matrix which consists of $k_i$ basis vectors in the feature space, each a representing cluster center;

$n_i$ is a number of elements in data object i; and $f_i$ is a number of features for data object i.

20. The method according to claim 14, wherein at least one type of object comprises advertisements having a variable sponsorship fee in dependence on another object which is co-clustered based on the cluster indicator matrices.

* * * * *